United States Patent

[11] 3,595,130

[72] Inventor Paul Maker
       Marion, Mass.
[21] Appl. No. 844,925
[22] Filed July 25, 1969
[45] Patented July 27, 1971
[73] Assignee Bird Island, Inc.
       Boston, Mass.
       Continuation-in-part of application Ser. No.
       778,579, Nov. 25, 1968, now abandoned.

[54] GEAR MAKING
       32 Claims, 30 Drawing Figs.
[52] U.S. Cl. .................................................. 90/3,
                                                            90/9.6
[51] Int. Cl. ................................................. B23f 5/20
[50] Field of Search ..................................... 90/3, 4, 6,
                                                            9.6, 1, 9

[56]                 References Cited
              UNITED STATES PATENTS
1,516,524  11/1924  Fellows ......................... 90/3

Primary Examiner—Gil Weidenfeld
Attorney—Robert E. Hillman

ABSTRACT: Generating tooth profiles with a cutter having cutting edges which move about a common cutter axis, the workpiece also being rotated about an axis, the workpiece and cutter undergoing relative movement along a path, cutter and workpiece having basic rates of movement about their respective axes, with one of the basic rates being increased or decreased by a differential rate depending upon the rate of said relative movement, so that for each desired tooth profile the cutting edges will make a series of cuts tangent to the desired profile at a succession of lines, the basic rates of movement of the cutting edges and the workpiece about their respective axes having a ratio dependent on the ratio of the number of teeth in the gear to the number of cutting edges so that each edge will make a cut tangent to a desired profile as the latter passes across the path of movement of the respective cutting edge and so that between successive cuts tangent to any one desired profile there intervenes complete revolution of the workpiece.

GEAR MAKING

This application is a continuation-in-part of application Ser. No. 778,579,filed Nov. 25, 1968 now abandoned.

This invention relates to gear making.

A primary object of the invention is to provide improved gear making apparatus that will accurately (e.g., with low lead, index, profile, and concentricity errors) and at high speed generate a desired tooth profile. Other objects include provision of such apparatus that is capable of forming a desired fillet shape; produces a good surface finish (with such small ridges as remain between cuts being nonparallel to the line of contact between helical gears) with relatively few cuts and at low cost (e.g., with low tool and direct labor cost, low power consumption, small floor space requirement, and minimum parts handling equipment); is particularly suitable for use with carbide and ceramic tools providing long tool life; has a rigid and compact power train through which the cutters and workpiece are driven; employs a short workpiece feed motion; has an easily calibrated and maintained tool geometry enabling, e.g., simple sharpening or replacement of tools; and in which tooth thickness, helix angle, profile shape, and other parameters are easily controlled (e.g., to easily produce noninvolute profiles, or crowned teeth, or to reduce tooth thickness independent of tooth depth) independent of the tool geometry; all in a manner compatible with the use of cold formed blank, gear shaving or rolling, computer control and power monitoring for cutter wear.

In general the invention features generating tooth profiles with a cutter having cutting edges which move about a common cutter axis, the workpiece also being rotated about an axis, the workpiece and cutter undergoing relative movement along a path, cutter and workpiece having basic rates of movement about their respective axes, with one of the basic rates being increased or decreased by a differential rate dependent upon the rate of said relative movement, so that for each desired tooth profile the cutting edges will make a series of cuts tangent to the desired profile at a succession of lines, the basic rates of movement of the cutting edges and the workpiece about their respective axes having a ratio dependent on the ratio of the number of teeth in the gear to the number of cutting edges so that each edge will make a cut tangent to a desired profile as the latter passes across the path of movement of the respective cutting edge and so that between successive cuts tangent to any one desired profile there intervenes complete revolution of the workpiece. In another aspect the invention features a cutting tool having a cutting portion with a leading face provided with clearance relief relative to a reference plane, a cutting edge bordering the leading face for generating a desired tooth profile, a cutting tip for forming a desired fillet shape, and a mounting portion adapted to support the tool in a rotatable cutter body with the reference plane at an angle to the cutter body axis dependent upon the desired helix angle of the gear. In preferred embodiments the workpiece is fed along a straight line perpendicular to the workpiece axis and parallel to the cutter axis; the profile generating cutting edges all lie along straight lines which intersect the cutter axis and are in one plane perpendicular to the cutter axis; the tools include roughing edges for roughing out workpiece material adjacent to profiles opposite those being generated, and additional cutting edges for forming tooth tip relief, and are removably mounted in uniformly spaced fashion about the periphery of a cutter body; a second cutter generates profiles on the correspondingly opposite sides of the teeth from the profiles generated by the first cutter, each cutter during an infeed roughing cycle removing all material in the path of the generating edges of the other cutter, so that the generating edges (which are sharper than the roughing edges) cut only on a subsequent finishing cycle; cam operated controls are provided for the workpiece feed rate (e.g., to equalize chip thickness in successive cuts in the same toothspace) and for the relationship between feed rate and differential rotation rate of the cutters (to control the roughing pattern on the infeed, or to provide for noninvolute profiles), both cams being responsive to the instantaneous accumulated amount of feed motion by being mounted to rotate in correspondence with the feed; the differential control includes a pivoted lever to which the workpiece support is coupled by a cam operated member variable to change the position of the support relative to the lever, thereby changing the phase angle between the cutters, the lever pivot axis being adjustable for control of the lever ratio (and hence of the corresponding involute base circle diameter); a main drive (including rotatably driven opposite handed worms, and a worm wheel connected to each cutter) imparts to the cutters and to the workpiece movement about their respective axes at basic rates such that the basic rate of each cutter bears a ratio to the basic rate of the workpiece equal to the ratio of the number of gear teeth to the number of cutting edges in the cutter, and a differential drive (including the pivoted lever) imparts to the cutters differential rates of movement about their axes dependent upon the rate of the relative linear movement of the workpiece and the cutters, the differential rate being added by the differential drive to the basic rate of one cutter and subtracted from the basic rate of the other cutter; cuts are made respectively tangent to a desired profile of every tooth during each complete revolution of the workpiece; and an adjustable element determines the phase angle between the respective cutting edges of the cutters at the start of the cutting cycle to determine tooth thickness.

In other preferred embodiments the profile generating cutting edges of each cutter lie along the elements of a wide-angled cone.

Other objects, features, and advantages will appear from the following description of a preferred embodiment of the invention, taken together with the attached drawings thereof, in which.

The particular apparatus to be described will make from gear blank 20 (FIG. 1) a gear 21 (FIG. 21) having teeth 22 with tooth profiles 23 and fillets 24. Terminology used herein is consistent with that of American Gear Manufacturers Association Standard Number 112.04 (Aug. 1965).

Figure 1:
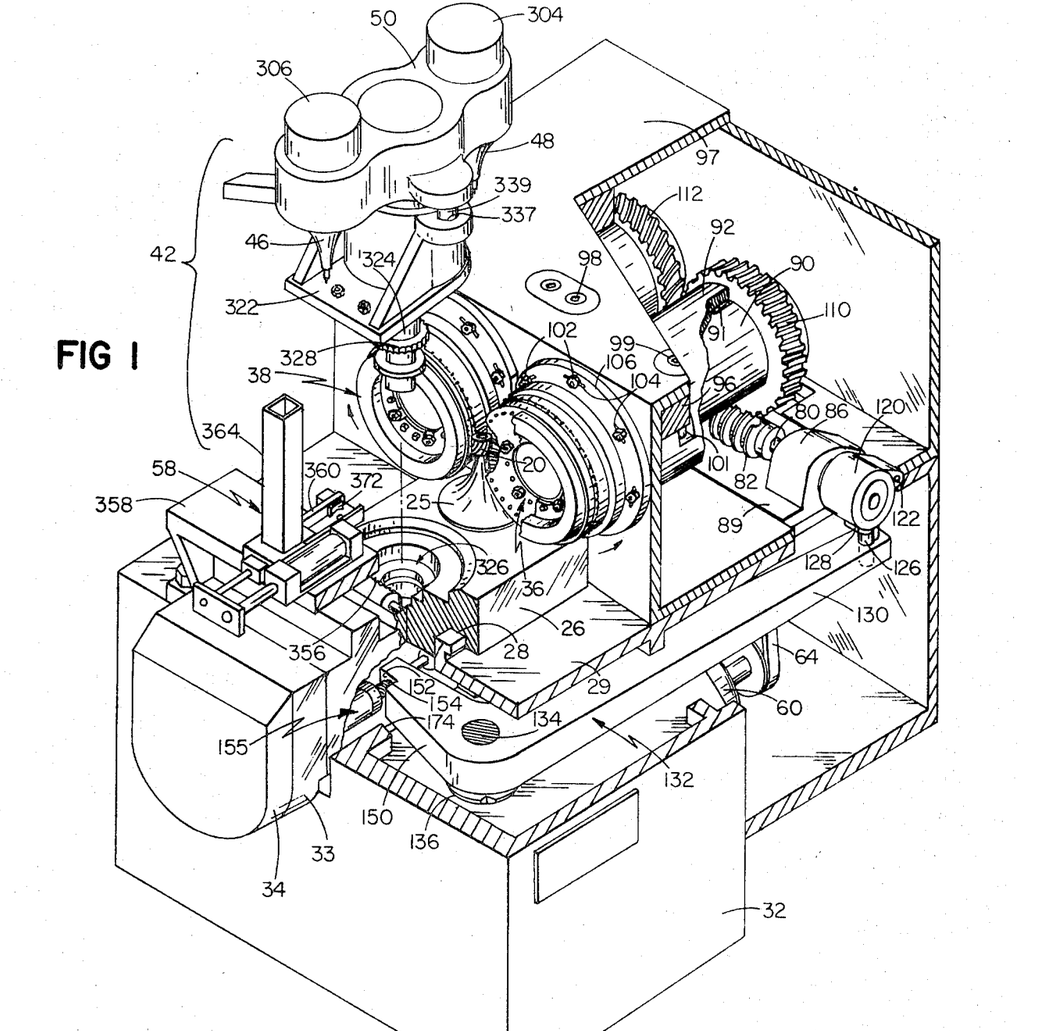
FIG. 1 is an isometric view, partially broken away and exploded, of the overall machine.

Referring to FIG. 1, work spindle 25 (of carbide, for stiffness) carrying as a workpiece gear blank 20, is mounted for rotation on slide 26 in turn mounted for linear movement on ways 28 of platform 29 supported on machine base 32. Apron 33, with removable cover 34, is secured to slide 26 and overhangs the front of the machine. Cutters 36 and 38 are respectively mounted for rotation in opposite directions (from the point of view in FIG. 1, as indicated by the arrows) about parallel axes perpendicular to, and spaced at equal center distances from, the axis of rotation of work spindle 25. Automatic gear blank loading assembly 42 (shown in part exploded out of its actual position) is mounted on slide 26 and includes a pair of carbide work spindle adapters 46 and 48 carried on spider 50, and a gear blank supply station 58.

Figure 2:
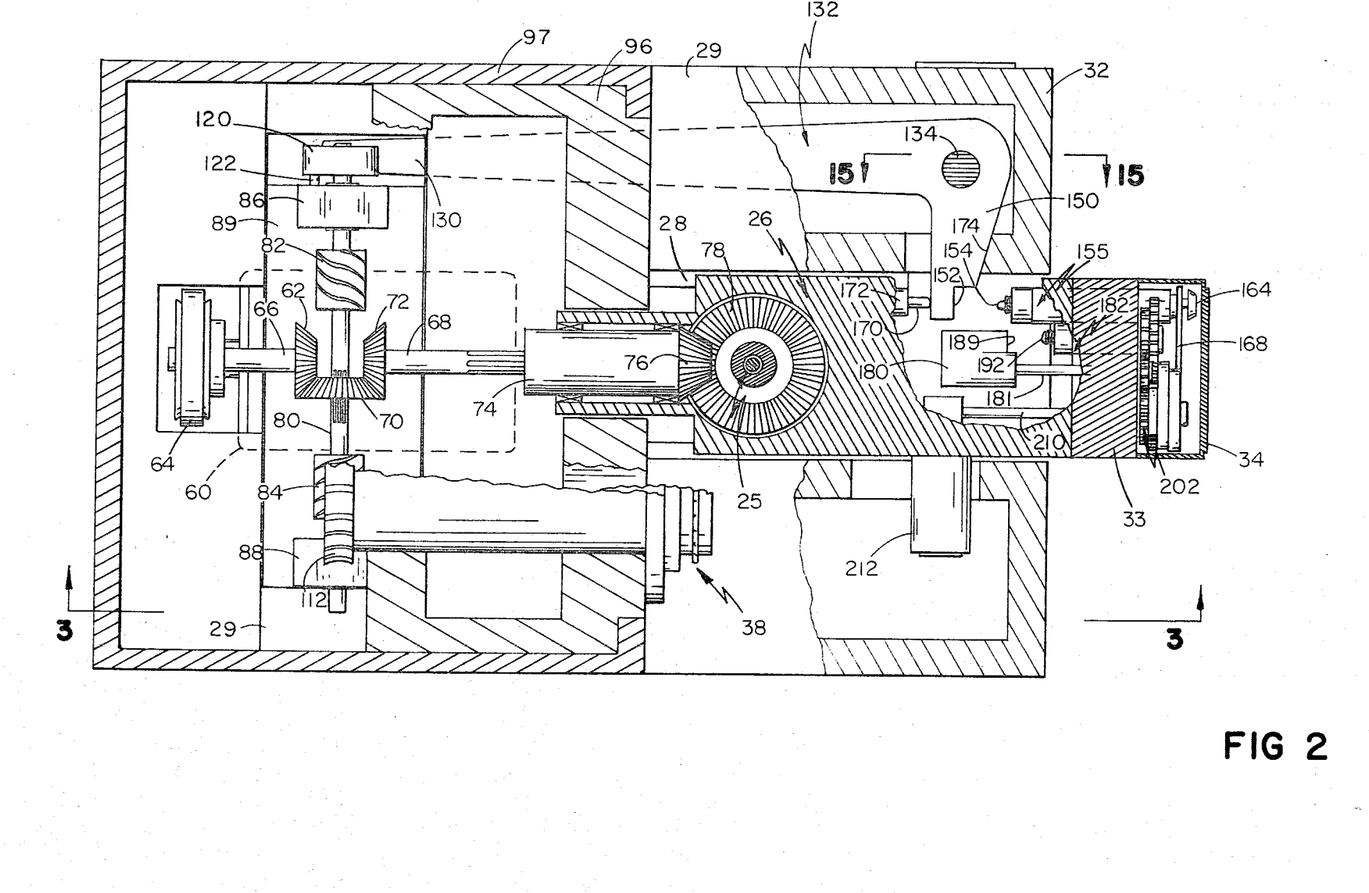
FIG. 2 is a semischematic plan view partially broken away showing the work slide fully retracted.
Figure 3:
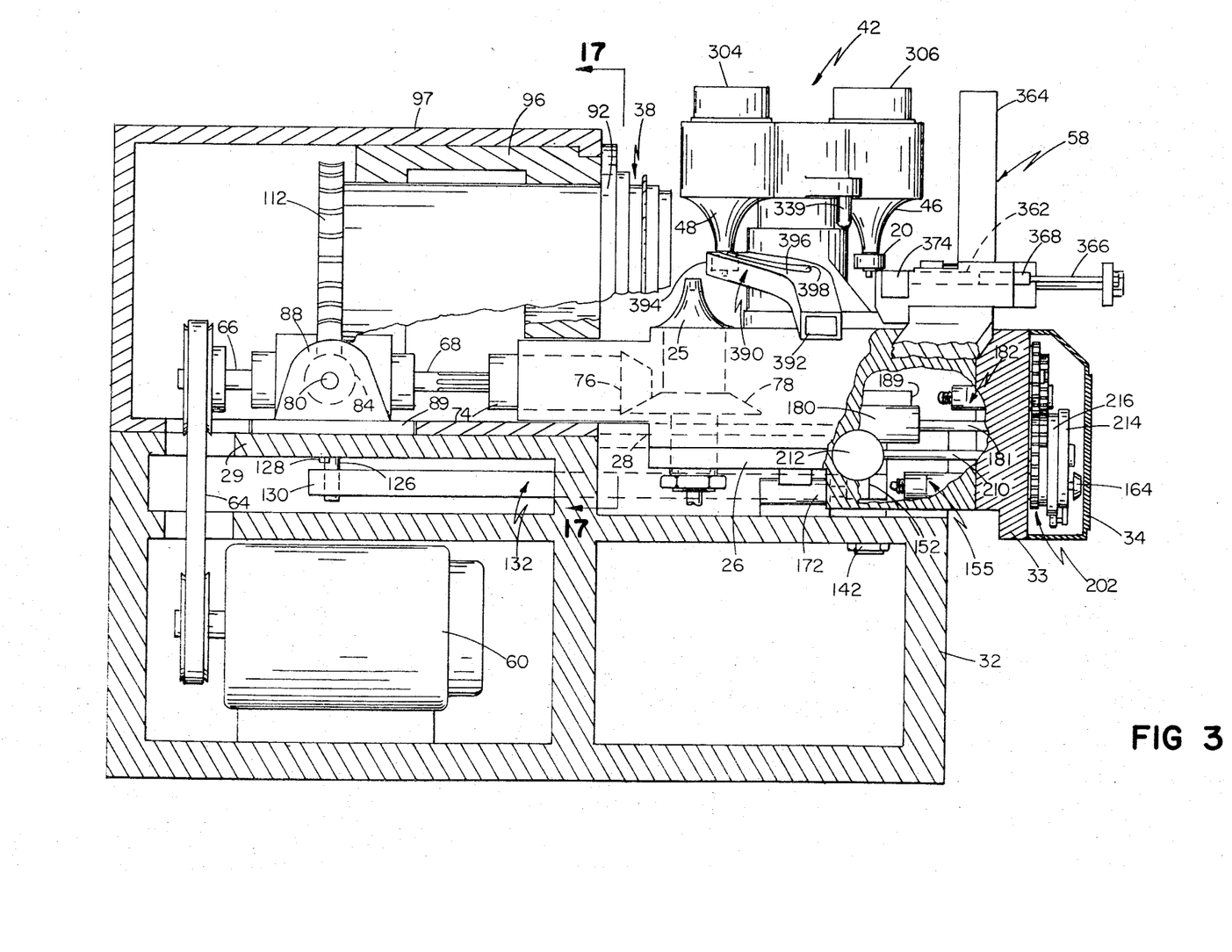
FIG. 3 is a semischematic view, partially broken away, taken along 3–3 of FIG. 2, showing the work slide partially retracted.

As best shown in FIGS. 2 and 3, motive power for rotating the work spindle and the cutters is supplied by motor 60, which drives bevel gear 62 (FIG. 2) through belt 64 and shaft 66. Gear 62 in turn drives shaft 68 through bevel gears 70 and 72. Shaft 68 is splined to sleeve 74 mounted for rotation (but axially fixed) in slide 26. Sleeve 74 carries bevel gear 76 which drives bevel gear 78 to rotate spindle 25.

Gear 70 is splined to shaft 80, which carries opposite handed worms 82 and 84 and is supported for rotary and axial movement in combination rotary-linear bearings 86 and 88 mounted on plate 89 in turn bolted to platform 29.

Figure 17:
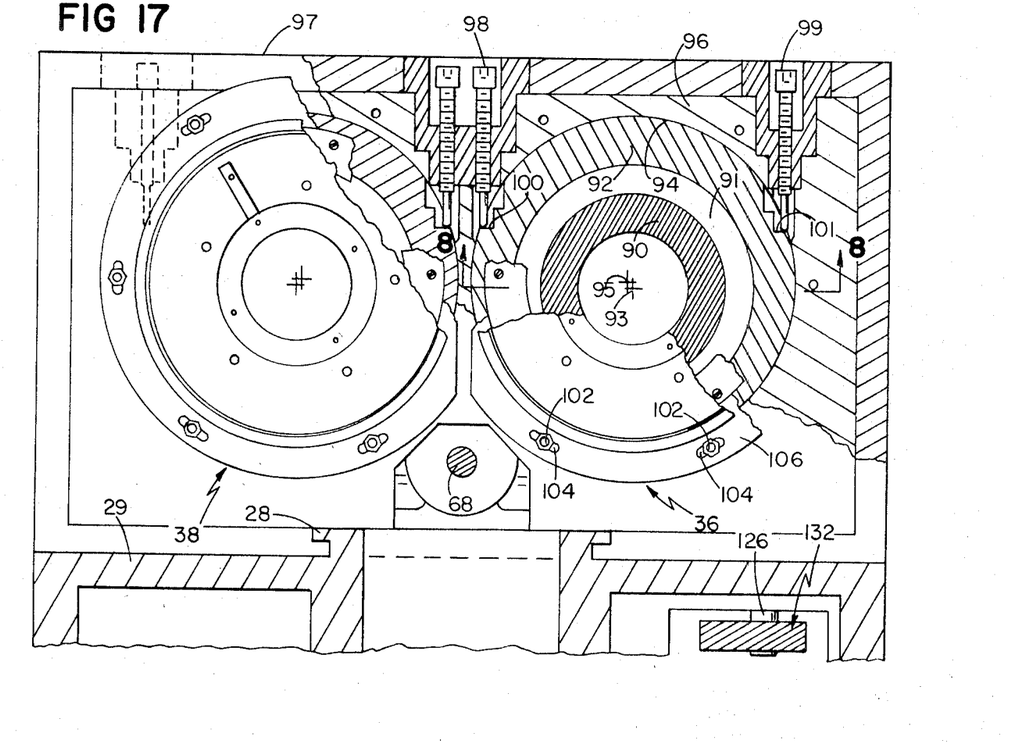
FIG. 17 is a sectional view along 17–17 of FIG. 3, partially broken away, with the cutter heads not shown.

Cutter 36 is mounted on spindle 90 (FIGS. 1, 8, 17) which is carried in eccentric sleeve 92 for rotation in bearing 91 about axis 93. Sleeve 92 is in turn mounted in cylindrical bore 94 of cartridge 96 fixed in housing 97 mounted on platform 29. Adjustment bolts 98 and 99 pass through housing 96 and bear against flats 100 and 101, respectively, on sleeve 92. Bolts 102 (only one shown in FIG. 8) pass through holes 104 in flange 106 of sleeve 92 to fix the sleeve in cartridge 96. Holes 104 are elongated to allow up to 3° of rotation of sleeve 92 in cartridge 96 about axis 95 of the housing, upon loosening of bolts 102 and adjustment of bolts 98 and 99, thereby to change the center distance between the axis of work spindle 25 and cutter axis 93 by up to 0.013 inch (with a corresponding maximum shift of the cutter axis in the direction parallel to the work spindle axis of only 0.0003 inch).

Figure 8:
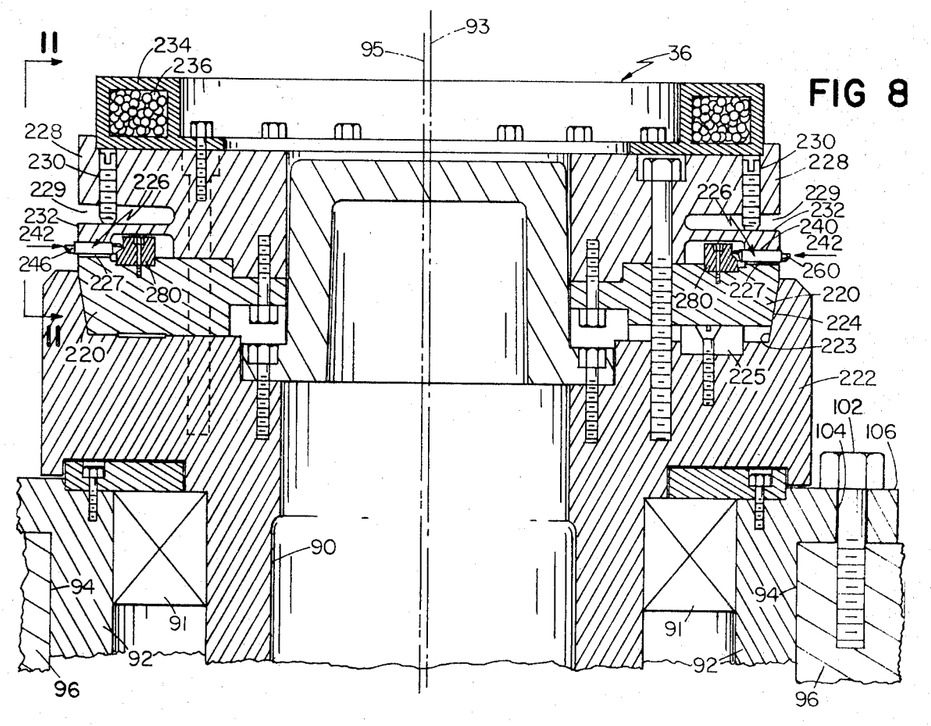
FIG. 8 is a sectional view of one cutter, taken along 8–8 of FIG. 17.

Spindle 90 is driven by worm 82 through worm wheel 110.

Cutter 38 is mounted in the same way as cutter 36, and is driven in rotation by worm 84 through worm wheel 112 (FIGS. 1,2).

Shaft 80 extends through bearing 86 and carries at one end rotary bearing 120 (FIGS. 1,2). Pin 122 extends between the housings of bearings 120 and 86 to prevent their relative rotation, while allowing bearing 120 to move axially with shaft 80. Pin 126 (FIGS. 1,3) is carried by reed block 128 mounted on the underside of bearing 120, and is journaled in the end of arm 130 of lever 132.

Figures 15, 16:
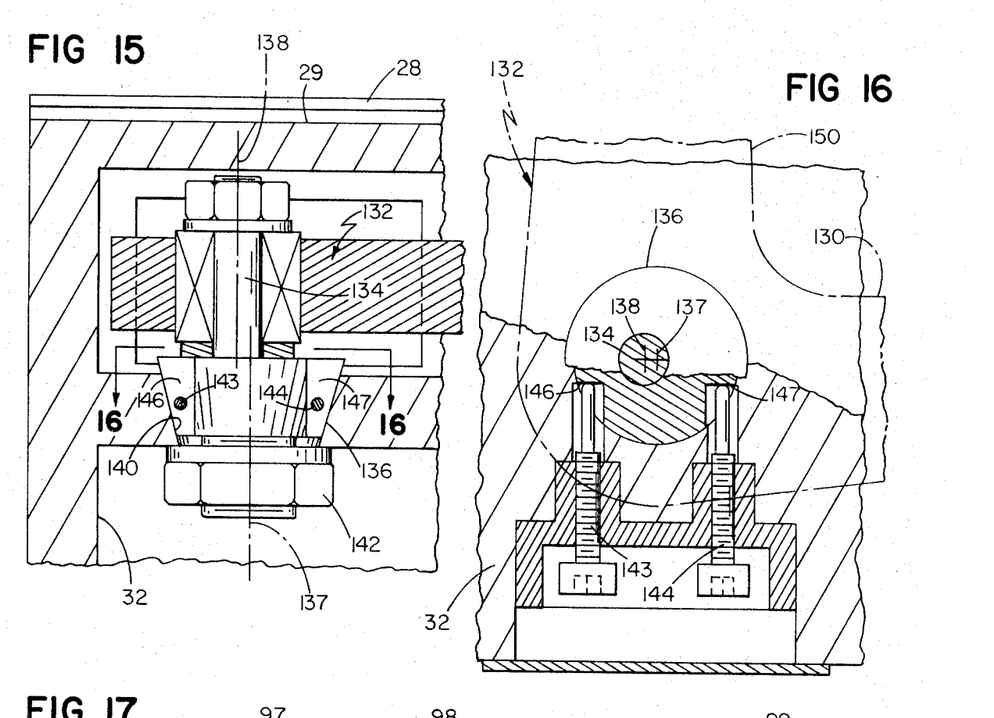
FIG. 15 is a sectional view along 15–15 of FIG. 2.
FIG. 16 is a sectional view along 16–16 OF FIG. 15.

Lever 132 is pivoted on shaft 134 (FIGS. 1, 15, 16) which has a frustoconical shank 136 the axis 137 of which is eccentric to axis 138 of shaft 134. Shank 136 is held tightly in hole 140 of base 32 by nut 142. Bolts 143 and 144 in base 32 bear against flats 146 and 147, respectively, on shank 136. Shank 136 can thus be rotated up to 3° by loosening nut 142 and adjusting bolts 143 and 144. The short lever arm 150 has a flat 152 (FIGS. 2—7) against which abuts (during the cutting portions of the machine cycle) the tip of inner screw 154 of phase control 155, to be described. The effect of rotation of shank 136 is to shift axis 138 (about which lever 132 pivots) along the direction of lever arm 150 by up to 0.016 inch (with a corresponding maximum shift of axis 138 along lever arm 130 of only 0.003 inch), thereby shifting flat 152 relative to screw 154 and hence changing the effective length of arm 150.

Phase control 155 (FIGS. 2—7) is carried in apron 33, and includes nut 158 (FIGS. 4,5) axially fixed in rotary bearing 160 mounted in the apron, outer screw 162 threaded in nut 158, and inner screw 154 threaded inside screw 162 and having a manual adjustment knob 164. Screw 162 is splined to bearing 160 at 166, so that rotation of nut 158, under the control of cam follower arm 168 affixed thereto, will result in axial movement of the two screws as a unit.

Rod 170 (FIG. 2) of power cylinder 172 acts as a spring to hold flat 152 against screw 154 so that lever 132 will pivot as slide 26 moves on ways 28 (as described in detail below). Stop 174 limits the motion of the lever as the slide retracts Double acting power cylinder 180 (FIGS. 2 3), fixed on base 32 with rod 181 fixed to slide 26, supplies the motive power for movement of the slide. Slide feed control 182 (FIGS. 2—5) determines the extent and speed of slide movement, and includes nut 184 mounted in rotary bearing 186 fixed in the apron, and screw 188 threaded in nut 184 and splined to bearing 186 at 190. Screw 188 abuts stop 189 (FIGS. 2, 3) on base 32 during the cutting portions of the machine cycle. Rotation of nut 184, to linearly advance and retract screw 188 is accomplished through gear 196 and gear 197, of slightly smaller diameter than gear 196, both carried by the nut.

To drive the nut, gear 198 (FIGS. 4, 5), of the same diameter as gear 197, is mounted on idler shaft 200 and meshes continuously with gear 197. Double sector gear 202 has one 180° sector 204 of diameter equal to that of gear 196, and a second 180° sector 206 of diameter equal to that of gear 197. The two sectors have the same number of teeth, overlap, and are mounted on shaft 210 driven in one direction by variable speed hydraulic motor 212. During each complete revolution of shaft 210, sector 204 drives gear 196 for one-half revolution, rotating nut 184 in one direction, and sector 206 drives gear 197 through idler 198 for the other half revolution, rotating the nut in the opposite direction.

Cams 214 (FIGS. 4—6) and 216 (FIGS. 4, 5, 7) are mounted on shaft 210 and operate hydraulic valve 194 and cam follower arm 168, respectively, arm 168 bearing against the cam 216 with roller 220. Valve 194 is in the fluid supply line to motor 212, to control the motor speed and hence the speed of rotation of nut 184.

Cutter 36 has a body 220 (FIGS. 8—14) bolted in the head 222 of spindle 90. Matching oblique surfaces 223 and 224 of head 222 and body 220, respectively, align the head and body, and key 225 prevents their relative rotation. A carbide tool 226 is clamped in each of a series of 90 radial V-grooves 227 (FIG. 11) equally spaced around the periphery of body 220, the tools being held in place by clamping ring 228 bolted to body 220. Ring 228 has a circumferential slot 229 across which pass tightening bolts 230 (one for each pair of tools). The tools are firmly clamped in place by turning bolts 230 to force ring portion 232 downwardly. A hollow ring 234, packed with small spheres 236 of tungsten alloy (e.g., 0.002 inch in diameter) is bolted to clamp 228 to dampen cutter vibrations during operation of the machine.

Figure 9:
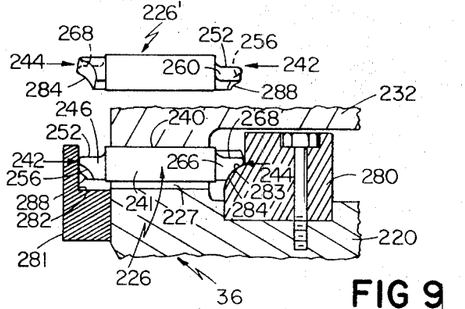
FIG. 9 is an enlarged fragment of FIG. 8, shown with the addition of a tool positioning ring, a tool being shown separately at the top in the incorrect endwise orientation.

Each tool 226 has a mounting portion 240 (see especially FIGS. 9, 10, 12—14) between a pair of cutting portions 242 and 244. Portion 240 has a pair of tool orienting flats 241 (FIG. 11) making an angle bisected by transverse tool axis 251, axis 251 being parallel to axis 93 when the tool is installed in the cutter (see FIG. 22). The flats respectively mate with the sides of groove 227. The tools are mounted in cutter 36 with cutting portions 242 protruding from head 220 (FIGS. 8, 9).

Each portion 242 has a leading face 246 tilted at a small clearance angle relative to an imaginary reference plane 248 (FIG. 22) which is at an angle to axis 93 of the cutter (and to tool axis 251) equal to the desired helix angle of gear 21 (taken at the base circle of the gear). The periphery of face 246 includes straight line cutting edge 252 in plane 248, cutting tip 254 having a radius of curvature matching that of fillet 24 of gear 21, a concave cutting edge 256 generally opposite edge 252, and a short concave cutting edge 258 forming a continuation of edge 252 and used to relieve the tips of gear teeth 22.

Edges 252 of all the tools in cutter 36 lie in a single plane perpendicular to axis 93. The side and tip surfaces 260, 262, and 264 of portion 242 all slope away from face 246 at small clearance angles to planes normal to reference plane 248, as indicated in part in FIG. 22.

Tool cutting portion 244 is, except for its orientation on the tool, a mirror image of portion 242, and has, e.g., a leading face 266 making a small clearance angle with reference plane 270, straight line cutting edge 268 in plane 270, cutting tip 271, tip surface 272. Faces 246 and 266 are on the same side of the tool, but differ in their orientation in that the corresponding reference planes 248 and 270 are respectively tilted to opposite sides of tool axis 251, each by an angle equal to the desired helix angle of gear 21 taken at the base circle. Planes 248 and 270 are thus at twice the helix angle to each other.

Figure 10:
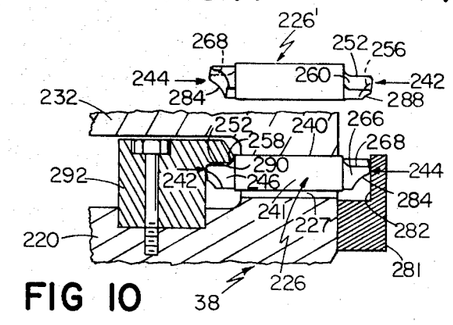
FIG. 10 is a view similar to FIG. 9, but showing a portion of the other cutter.
Figure 11:
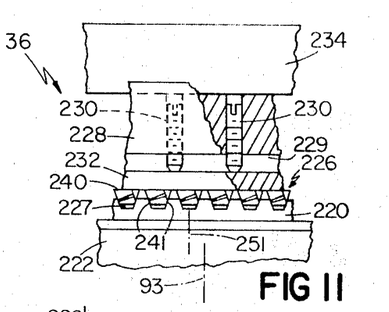
FIG. 11 is an enlarged fragment taken along 11–11 of FIG. 8.
Figures 12, 13, 14:
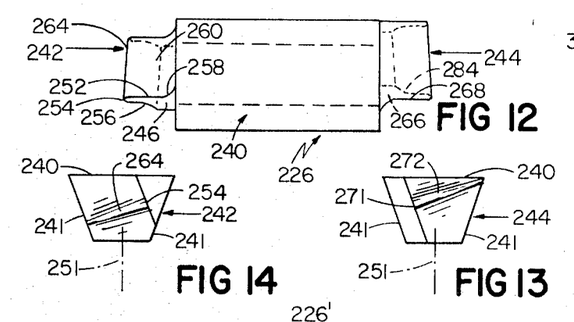
FIG. 12 is a plan view of a tool.
FIG. 13 is an end view from the right of FIG. 12.
FIG. 14 is an end view from the left of FIG. 12.

Cutter 38 is identical to cutter 36, except that its tools 226 are mounted with portions 244 protruding from the cutter head (FIG. 10). Leading faces 246 and 266 all face blank 20 as they approach the blank from above when the cutters are rotating in the directions indicated in FIGS. 1 and 22.

Tools 226 are radially oriented in cutter 36 by ring 280 bolted to head 220, and by removable ring 281 (FIG. 9) having a vertical positioning surface 282. Ring 280 has a curved surface 283 (FIG. 9) which matches tool edge 284 of portion 244 (the curvature of edge 284 corresponding to edge 256 of portion 242). The tools will just fit between surfaces 282 and 283 if they are inserted with portions 244 adjacent ring 280. If an attempt is accidentally made to insert a tool (i.e., tool 226' shown in FIG. 9) with portion 242 against ring 280, the tool will not seat in the V-groove, since, due to the difference in orientation of portions 242 and 244 relative to axis 291, edge 288 of surface 260 projects beyond edge 256 and will interfere with surface 283. After the tools are clamped in place, ring 281 is removed.

Tools 226 are similarly radially oriented in cutter 38, except that surface 290 (FIG. 10) of ring 292 matches the combination of tool edges 252 and 258, rather than edge 256.

The spacing of tools 226 about each cutter is chosen to make the circumferential distance between adjacent edges 252 or 268, along a theoretical cutter pitch circle, equal to the cotangent of the helix angle of gear 21 multiplied by the circular pitch of gear 21, both quantities being taken at the base circle of the gear. The radius of the theoretical cutter pitch circle is equal to the difference between the center distance spacing of the respective axes of rotation of cutter 36 (or 38) and spindle 25, and the base circle radius of gear 21. Since the radius of the cutter pitch circle is also dependent upon the circumferential spacing between tool edges 252 along that circle (for a given number of tools in the cutter), it follows that the center distance between cutter and gear blank axes determines the helix angle of gear 21 for a given base circle.

The ratio of the effective lever arm lengths of arms 130 and 150 of lever 132 determines the base circle of gear 21, and is equal to EF/GH, where E is the number of tools 226 in each cutter, F is the desired base circle diameter of gear 21, G is the desired number of teeth 22 in gear 21, and H is the common pitch diameter of worm wheels 110 and 112.

The eccentric mountings of the cutter spindles and of lever 132 respectively provide for fine adjustment of the helix angle and base circle radius of gear 21.

The ratio of the common rate rotation of cutters 36 and 38 (taken when slide 26 is stationary) to the rate of rotation of spindle 25 is equal to the ratio of the desired number of teeth 22 to the number of tools 226 per cutter.

Work spindle adapter 48 (FIGS. 1, 3, 18, 20) of automatic loading assembly 42 has an expansive arbor 300 with actuating pin 301, and elastomeric O-ring 302, and is mounted for rotation in one end of spider 50. Adapter 46 is identically structured and mounted at the opposite end of spider 50. Reversible motors 304 and 306 are provided to rotate or brake the adapter as described below.

Power cylinder operated rod 310 is mounted for axial movement against pin 301 (FIG. 20) in bore 311 of spindle 25.

Figure 18:
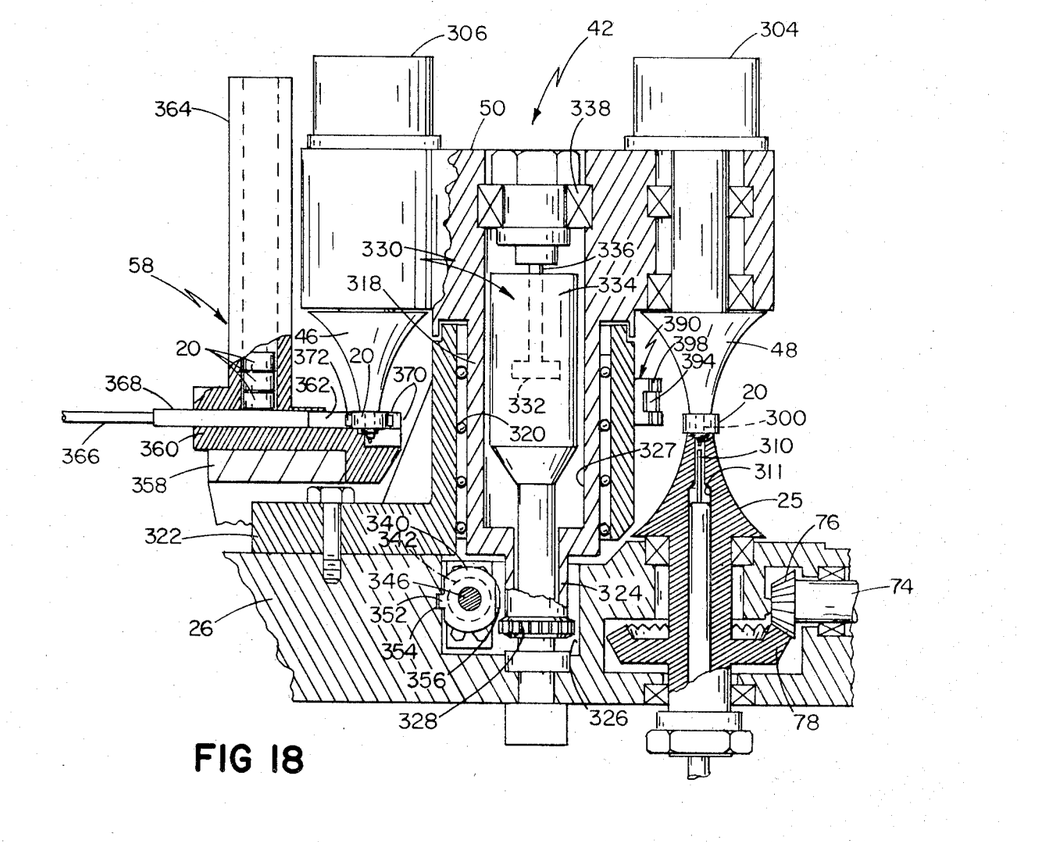
FIG. 18 is a partially sectioned elevation of the automatic loading mechanism.
Figure 19:
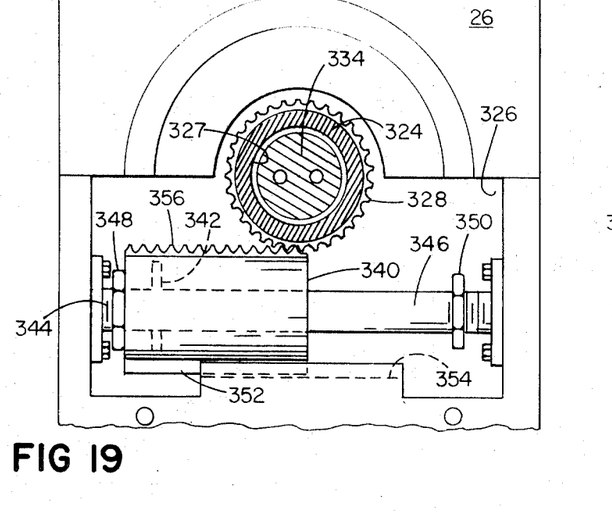
FIG. 19 is a fragmentary plan view partially cut away of a portion of the mechanism of FIG. 18.
Figure 20:
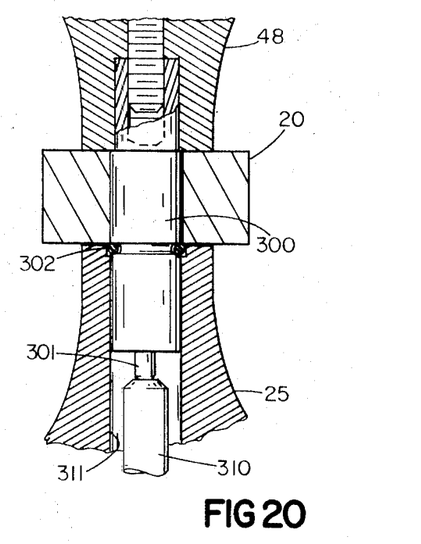
FIG. 20 is an enlargement of a portion of FIG. 18, with additional sectioning.

Cylindrical extension 318 (FIG. 18) of spider 50 extends through bearing 320 provided in bracket 322 bolted to slide 26. Reduced diameter portion 324 of extension 318 extends into recess 326 of slide 26 and carries a spur gear 328 (FIGS. 18, 19). Power cylinder assembly 330 is inside bore 327 in spider extension 318. Piston 332 in double acting cylinder 334, fixed at its bottom in recess 326, has its rod 336 axially fixed relative to spider 50 by bearing 338 mounted in bore 327, so that actuation of the cylinder will raise or lower spider 50 relative to slide 26. A pair of pilot holes 337 are provided on opposite sides of bracket 322 (only one shown in FIG. 1), and cooperate with pin 339 to rotationally lock spider 50 in its lowered position.

Power cylinder 340 (FIGS. 18, 19) has its piston 342 axially fixed between rods 344 and 346 mounted in recess 326. Cylinder 340 is thus free to move axially between adjustable stops 348 and 350, and has a ridge 352 that runs in groove 354 in slide 26. Rack 356 is ground into the exterior of cylinder 340, and meshes with gear 328, when spider 50 is in its raised position, to rotate the spider and reverse the positions of adapters 46 and 48.

Figure 25:
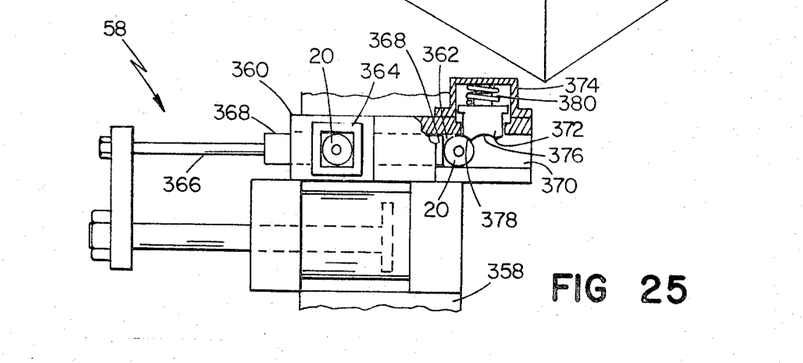
FIG. 25 is a plan view partially broken away of the supply station of the automatic loading apparatus.

Gear blank supply station 58 (FIGS. 1, 3, 18, 25) is mounted on bridge 358 fixed to frame 32 and includes a trough 360 providing a rectangular channel 362 supplied from a stack of blanks 20 in tube 364. Cylinder operated pushrod 366 controls a pushing block 368 which fills the cross section of channel 362 and reciprocates therealong to advance blanks as needed to the open forward end of the channel. Trough 360 is open at 370 at its forward end to expose a single blank there for loading on one of the spindle adapters. Locating block 372 (FIG. 25) is mounted in housing 374 adjacent opening 370, and extends into the channel. Front surface 376 is contoured to match the exterior surface of a gear blank, and is relieved at 378 so that block 368 can push a blank 20 into position adjacent surface 376. Spring 380 biases block 372 against a blank 20 in position to be loaded.

Pickoff 390 (FIGS. 3, 18) is mounted on bracket 322 and has a channel 392 the mouth 394 of which is level with a blank 20 carried on adapter 46 or 48 when spider 50 is in its raised position. The channel slopes downwardly from mouth 394 so that its top wall 396 will act as a cam to remove a completed gear from the adapter as it passes by upon rotation of spider 50. Wall 396 has a slot 398 for passage of arbor 300.

Suitable control circuitry is provided to properly sequence the various operations of the machine.

The operation of the machine is in part dependent be upon the shapes of cams 214 and 216, which can, of course, by changed. Operation with circular cams (or, as is equivalent, with follower arm 168 removed and motor 212 running at constant speed) will be described first.

Operation will be considered from the time when spindle 25 and cutters 36 and 38 are in rotation at constant speed under power of motor 60, and cylinder 180 is expanded to hold slide 26 in its fully retracted position (FIG. 2) with screws 154 and 188 separated from flat 152 and stop 189, respectively. Cylinder 172 holds lever arm 150 against stop 174. Spider 50 is in its lowered position with the arbor of adapter 46 inserted in the bore of a blank in trough 360 (FIG. 18). Gear 328 is out of mesh with rack 356, with cylinder 340 against stop 348. Arbor 300 of adapter 48, carrying a blank 20, is in bore 311 of spindle 25. Rod 310 is pressed against pin 301 (FIG. 20) so that arbor 300 is expanded into tight, driving engagement with the blank and with the inner surface of bore 311. Motors 304 and 306 are turned off. Motor 212 is operating, and sector 204 of gear 202 is about to engage gear 196 to begin retraction of screw 188.

Further operation is initiated by reversing cylinder 180 to rapidly advance slide 26 until screw 188 hits stop 189, at which position screw 154 will be in contact with flat 152. With the slide in this position, blank 20 on arbor 300 is adjacent the paths of tools 226 of cutters 36 and 38, and the next blank carried by adapter 46 is out of trough 360 and held on its corresponding arbor by the O-ring. Rod 366 is actuated to move another blank into loading position adjacent block 372.

Figures 21, 22, 23, 24:
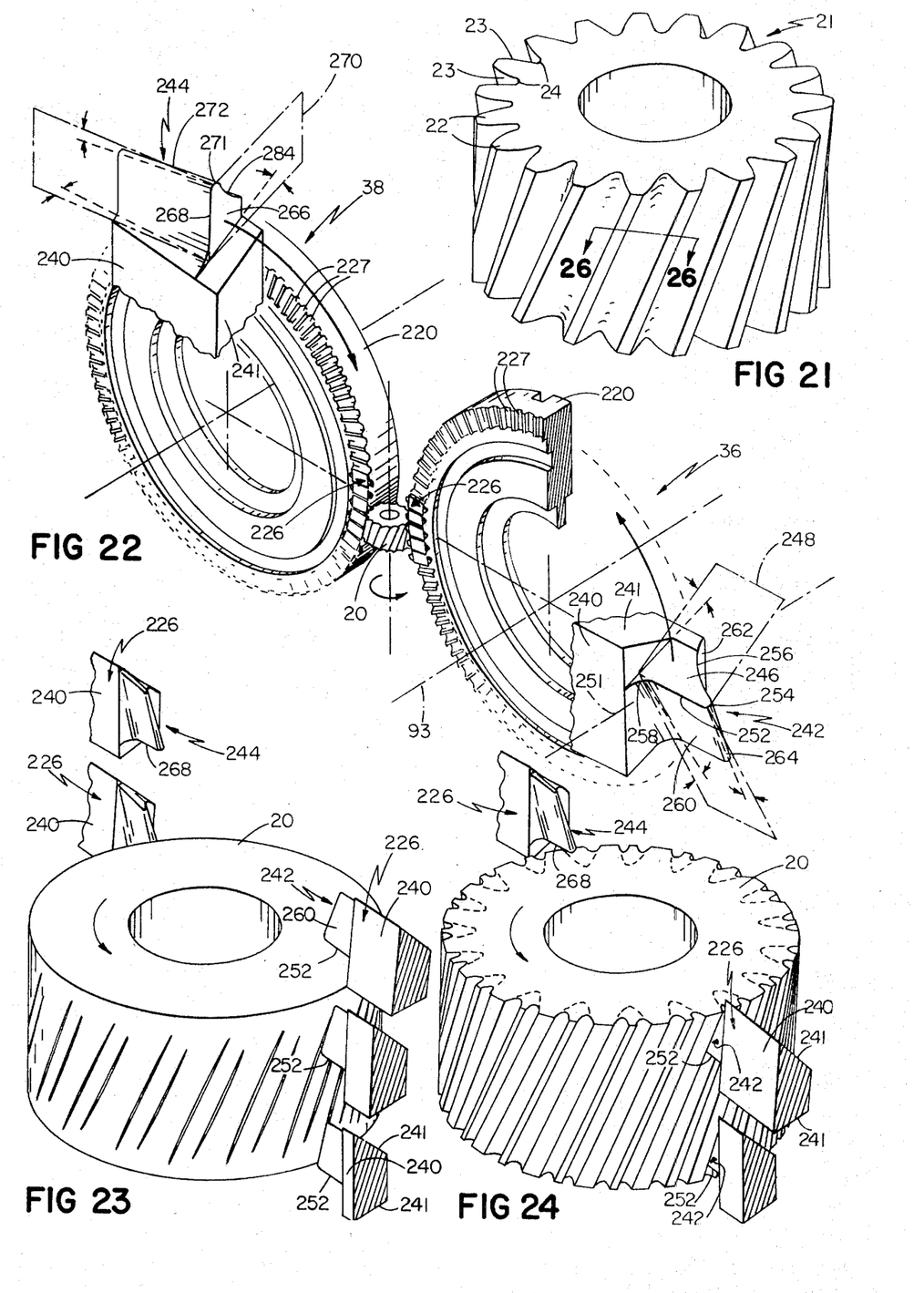
FIG. 21 is an isometric view of the gear to be made.
FIG. 22 is a semischematic view showing portions of the two cutters and a workpiece, most of the tools being omitted, and one tool fragment in each cutter being shown in enlarged scale.
FIG. 23 is a semischematic view showing the relationship of selected tools of both cutters to the workpiece at a time when only shallow cuts have been made.
FIG. 24 is a view similar to FIG. 23 taken when the cuts are deeper, the tooth profiles to be generated being shown in phantom.
Figure 26:
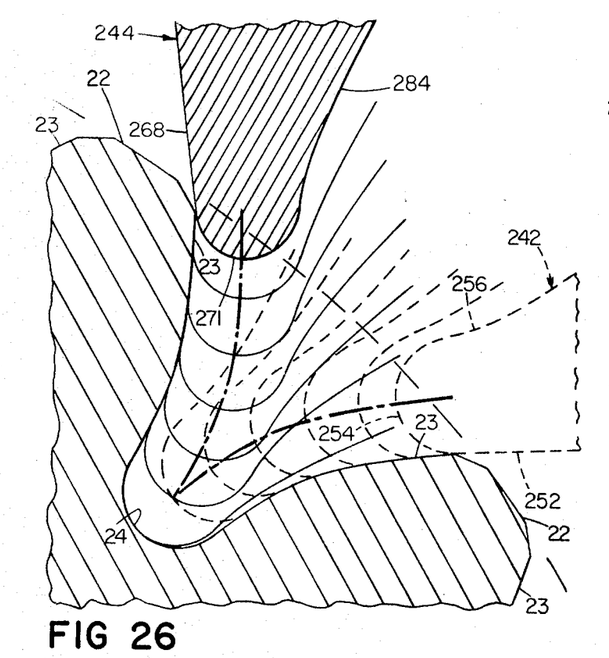
FIG. 26 is a semischematic view taken along 26-26 of FIG. 21 and additionally showing a sequence of selected tool positions of the cutting tools relative to the gear ultimately produced, the tools of one cutter being shown in dashed lines, the loci of positions of a single point on the tools of each cutter being shown in heavy dashed lines.

Further forward motion of the slide is made possible only by the continued retraction of screw 188, which occurs at a constant rate. As the slide moves forward, cutters 36 and 38 will simultaneously generate tooth profiles on the correspondingly opposite sides of teeth 22. Considering the action of cutter 36 as typical, one tool 226 will sweep across the face width of the gear blank adjacent one tooth position, the next tool will make a corresponding cut adjacent the very next tooth position, and so on, so that a corresponding cut will be made on the corresponding side of each tooth before a second cut is made on the same side of the first tooth. Because of the circular motion of the tools, the early cuts will not extend across the full face width of blank 20 (FIG. 23). However, the advance of slide 26 will cause successive cuts on each tooth to be deeper and deeper, so that before long the cuts will extend across the full face width (FIG. 24). Lever 132 is caused to pivot by screw 154 pressing against flat 152, and in turn moves shaft 80, and hence worm 82, axially through a distance proportional to the advance of slide 26, so that a differential rotation is added to the basic rotation of cutter 36, the latter being produced by the rotation of worm 82. Rotation of lever 132 is facilitated by reed block 128. The linear advance of blank 20 and the differential rotation of cutter 36 together constitute an effective rolling motion of the blank relative to the cutter and cause the successively deeper cuts by tool edges 252 on any given tooth to be tangent to the desired involute tooth profiles 23 at lines successively approaching the desired root circle of gear 21. Selected positions in the sequence of successive tool positions are shown in FIG. 26 for a pair of facing profiles 23, one generated by the tools cutter 36, the other by the tools of cutter 38. The heavy dashed lines show the loci of positions of a single point on the tools of each cutter. Considering the action of cutter 36 as typical, the involute portions of the tooth profiles are fully generated by tool edges 252. Tool tips 254 form (rather than generate) the tooth fillets on the final, deepest cuts on the respective teeth. The fillet shape can therefore be chosen for optimum strength, and can either be undercut or not as desired. Tool edges 256 rough out material in the paths of the tools of cutter 38 (just as the tools of cutter 38 rough out material in the paths of the tools of cutter 36), once slide 26 has advanced sufficiently so that the tool paths of the respective cutters overlap. Tool edges 258 form tooth tip relief during the last few cuts on each tooth.

Cutter 38 operates the same way as cutter 36. The differential rotation proportional to the axial movement of shaft 80 is subtracted from the basic rate of rotation of cutter 38 (by virtue of the opposite handedness of worms 82 and 84), as is necessary because the two cutters generate the correspondingly opposite profiles of teeth 22.

The number of tools in cutter 36 is chosen to be prime to the number of teeth 22, so that a different tool will make each successive cut adjacent a given profile, thereby averaging any ripple errors.

Blank 20 will have been cut to the desired depth by the time sector 204 of gear 202 disengages from gear 196, and sector 206 engages idler 198, to reverse the direction of rotation of screw 188, and hence cause slide 26 to retract (against the continued force of cylinder 180). On the reverse movement of the workpiece the cutters will smooth out any irregularities in the tooth profiles caused on the initial cutting cycle, e.g., by mechanical deflection due to the cutting forces. As soon as the workpiece is out of the path of the cutters, cylinder 180 is reversed to rapidly retract the slide to its outermost position. During the rapid retraction, rod 310 is drawn away from pin 301, so that arbor 300 will contract; the cylinder 334 is reversed to raise spider 50, lifting arbor 300 (carrying the completed gear) from spindle 25, and bringing gear 328 into mesh with rack 356. Cylinder 340 is now reversed to move itself against stop 350, rotating spider 50 by 180° to bring the new blank carried by adapter 46 into position for being worked in the next cutting cycle, just as described above. As the spider rotates, the completed gear on arbor 300 enters mouth 394 (FIG. 3) of pickoff 390 and is stripped from the arbor. When slide 26 reaches its outermost position cylinder 340 is reversed to lower spider 50, dropping arbor 300 into a new blank in trough 360, and coupling adapter 46 and spindle 25. As soon as the new blank is seated on spindle 25, rod 310 is raised to expand the arbor of adapter 46. Cylinder 340 is again reversed to move itself against stop 348 for meshing with gear 328 on the next cycle.

Tooth thickness for gear 10 is determined by the phase angle between the tools of cutter 36 and those of cutter 38. That phase angle can be adjusted by turning knob 164, thereby axially shifting screw 154 in screw 162 and changing the distance between the plane of cutting edges 252 and 268 and the gear blank for a given position of lever 132 (the phase angle change resulting from the fact that the cutters turn in opposite directions). Therefore, during the rapid advance of slide 26, screw 154 may hit flat 152 before screw 188 hits stop 189.

Figure 27:
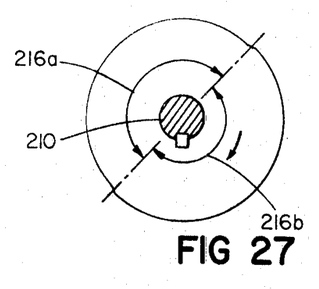
FIG. 27 is an elevation of an alternative phase control cam.

If desired, the phase angle can be changed slightly after the workpiece has been initially cut to depth, so that on the reverse cutting cycle the tools will remove a small amount of additional stock from the workpiece, further improving the finish. This can be accomplished, e.g., by rotation of nut 158, to advance or retract screws 154 and 162 as a unit. To this end, cam 216 can have one 180° sector 216b (FIG. 27) of its surface of radius slightly larger than that of its other 180° sector 216a, and arranged so that roller 218 will shift from sector 216a to sector 216b when the workpiece has been initially cut to depth. Thus, although tool edges 252 and 268 generate profiles on the forward cutting cycle, additional, and final, profiles may be generated on the reverse cutting cycle, through operation of phase control 155.

Figure 28:
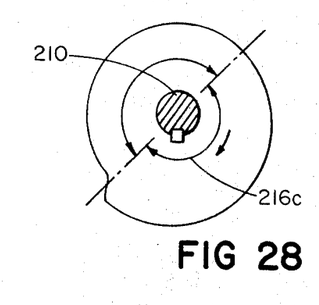
FIG. 28 is an elevation of another alternative phase control cam.

So long as roller 218 follows a constant-radius sector of cam 216 on the reverse cutting cycle, the final tooth profiles 23 will be of involute form. However, noninvolute profiles can be generated by causing roller 218 to follow a cam sector 216c (FIG. 28) the radius of which varies during the cutting cycle in which a final profiles is determined. The variation in cam radius produces a cutter phase angle change during the profile generating cycle, so that edges 252 and 268 will make cuts to one side or the other of the involute profile that would otherwise be generated. This type of phase angle change can also be used, instead of cutting edges 258, to relieve the tips of the teeth.

Figures 4, 6, 7:
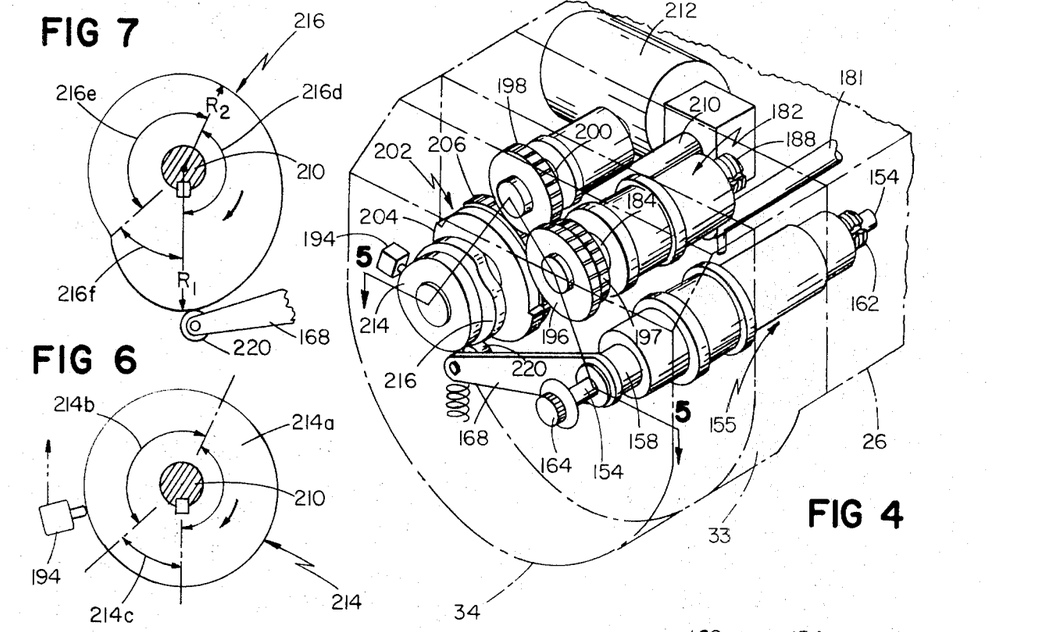
FIG. 4 is an isometric view showing the interior of the work slide and work slide apron, the slide and apron being shown in phantom.
FIG. 6 is an elevation showing the feed control cam.
FIG. 7 is an elevation showing the phase control cam.
Figure 5:
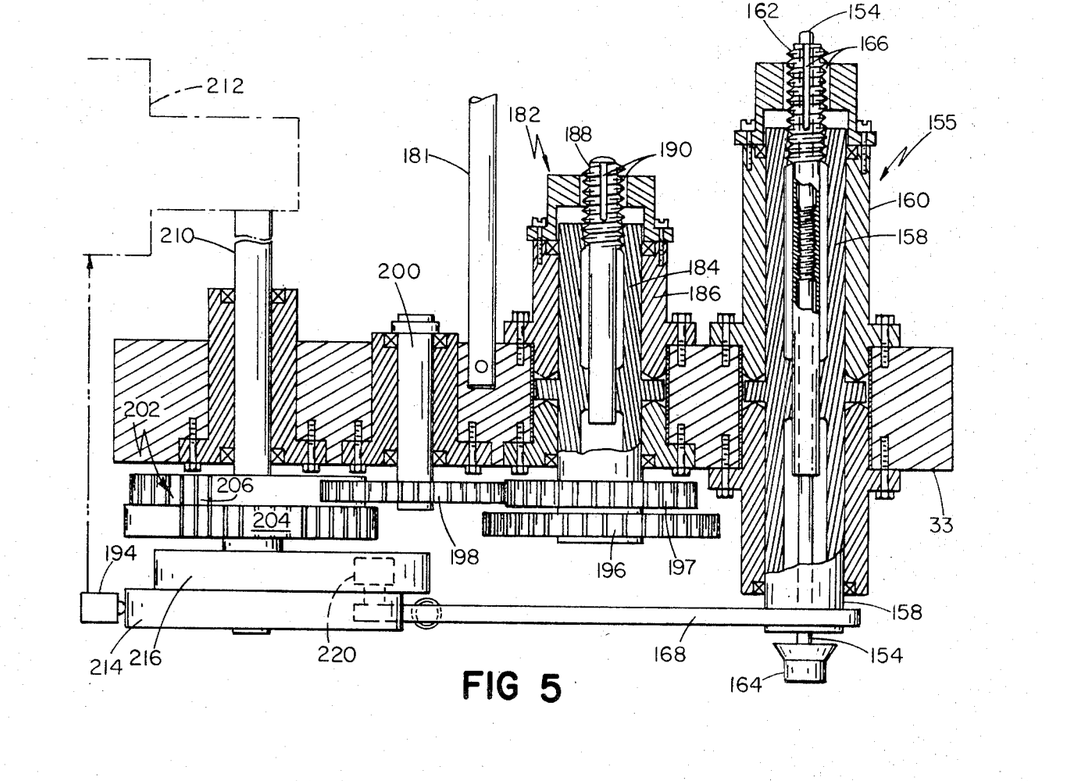
FIG. 5 is a sectional view taken along 5–5 of FIG. 4.
Figure 29:
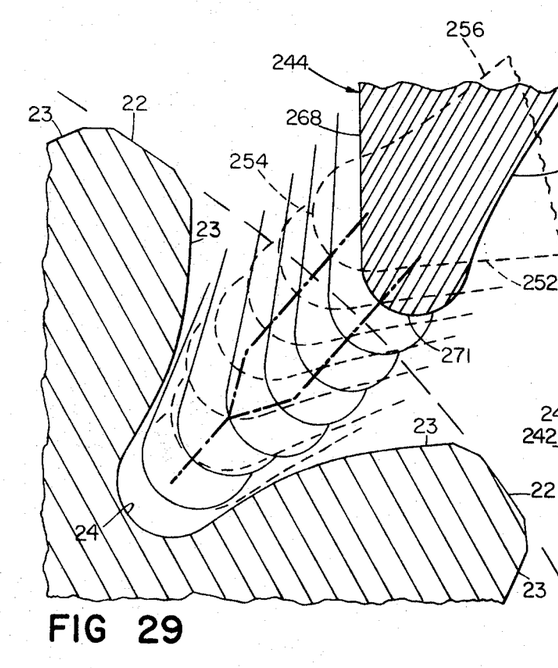
FIG. 29 is a view similar to FIG. 26, but showing selected tool positions during a roughing infeed cycle.

Alternatively, as shown in FIG. 7, cam 216 can be shaped to cause generation of an involute profile during the reverse cutting cycle, and to cause continuous adjustment of phase control 155 during the forward cutting cycle. Corresponding selected positions in the sequences of successive tool positions for cutters 36 and 38 during the forward cutting cycle are shown in FIG. 29, the tool outlines for cutter 38 being shown in solid lines, and those for cutter 36 in broken lines. Cam sector 216d corresponds to the forward cutting cycle (after the rapid advance of slide 26), and has a slope from an initial radius $R_1$ to a final radius $R_2$, the latter corresponding to a maximum depth cut tangent to the desired final profile. As a result, on the forward cutting cycle, the tools are shifted laterally from the desired tooth profiles across the center line of the tooth space so that edges 256 and 254 of the tools of cutter 36 will remove, on each cut, any metal in the path of edge 268 of the next tool of cutter 38 to enter the tool space. The tools of cutter 38 will similarly prepare the way for edges 252 of the tools of cutter 36, so that on the forward cutting cycle edges 252 and 268 will do no cutting. For the reverse, profile generating cycle, cam sector 216e is of constant radius $R_2$, so that edges 252 and 268 will make cuts tangent to the desired involute profiles, as discussed earlier in connection with FIG. 26. The remaining cam sector 216f rapidly slopes back to radius $RR_1$, and corresponds to the rapid retraction and advance of slide 26 when the cutters are not in contact with the workpiece. One advantage of this arrangement is that the load on the profile generating cutting edges is reduced, since most of the metal is removed by other portions of the tool, thereby increasing tool life between sharpenings.

Cam 216, shaped as shown in FIG. 7, is advantageously used with a noncircular cam 214, shaped as shown in FIG. 6, and with tools 226 ground with their cutting edges slightly rounded rather than knife-edge sharp. Because of their rounded edges the tools will not remove stock unless slide 26 is advanced (or, on the reverse cycle, retracted) between successive cuts by a distance at least as great as the radius given the particular tool edge doing the cutting. On the other hand, for finishing the profiles smoothly, it is desireable that successive cuts be very close together. Both these considerations can be accommodated with the cutting pattern of FIG. 29, by rounding finishing edges 252 and 268 with a small radius of, e.g., 0.0005 inch, and rounding the remaining edges with a larger radius of, e.g., 0.003 inch, and by providing cam 214 with a sector 214a for the forward cutting cycle having an increasing radius. Sector 214a causes valve 194 to progressively slow motor 212 as the slide advances, while always providing for a slide advance between successive cuts in a tooth space that is larger than the radius of the tool roughing edges. The deceleration of the slide equalizes the thickness of the chips taken out of the workpiece by the tips of the tools, hence making more uniform the load on the tools to further improve tool life. On the reverse, profile generating cycle, cam sector 214b of decreasing radius again controls chip thickness as desired, more closely spaced cuts being made possible by the sharper edges 252 and 268. Cam sector 214c is of constant radius, corresponding to rapid retraction and advance of the slide.

Figure 30:
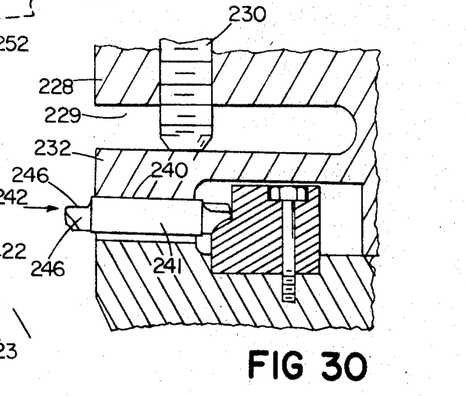
FIG. 30 is an enlarged view similar to FIG. 9, partially sectioned, of a fragment of a cutter illustrating another embodiment of the invention.

In FIG. 30 there is shown another preferred embodiment identical to that of FIG. 1 except that the V-grooves of both cutters are at angles to the cutter axes so that edges 252 and 268 respectively lie along elements of wide-angled concave cones (e.g., 177°—179° included angle). In operation this embodiment will produce crowned gear teeth having involute form to within normally acceptable dimensional tolerances, and can also, of course, be used to produce crowned teeth of noninvolute form.

Certain subject matter disclosed above and relating generally to the positioning and clamping of the tools with V-grooves, flats, a clamping ring with a series of tightening bolts, and locating rings; to the double-ended nature of the tools; and to the loading and unloading of gear blanks; represents inventions of Alexander D. F. Moncrieff.

Other embodiments (e.g., in which the angle between the cutter and workpiece axes is other than 90°, as would be useful, e.g., to make spur gears, since, as can be seen, the continuous indexing rotation of the workpiece will cause the angle between those axes to differ from the helix angle of the gear; or the two cutters are on the same side of the workpiece, while still respectively generating the profiles on opposite sides of each tooth; or tool leading face 144 is dished to provide cutting edge 256, as well as edge 252, with clearance relief) are within the following claims.

What I claim is:
1. Apparatus for generating tooth profiles of a gear comprising
  a cutter having profile generating cutting edges lying along straight lines and mounted for movement about a common axis,
  a support for a workpiece rotatable about an axis,
  said support and said cutter being mounted for relative movement along a linear path nonparallel to the workpiece axis,
  said support and said cutter having basic rates of movement about their respective axes in the absence of said relative movement, and
  means for controlling the movement of said support and said cutter so that one of said basic rates of movement is increased or decreased, upon the occurrence of said relative movement, by a differential rate of movement dependent upon the rate of said relative movement, so that for each desired tooth profile said cutting edges will make a series of cuts on said workpiece respectively tangent to said desired profile along a succession of lines,
  said basic rates having a ratio dependent upon the ratio of the number of said cutting edges to the number of teeth in said gear so that each said cutting edge will make a cut tangent to a desired profile as the latter passes across the path of movement of the respective cutting edge and so that between successive cuts tangent to any one desired profile there will intervene a complete revolution of said workpiece.

2. The apparatus of claim 1 wherein cuts are made respectively tangent to corresponding desired profiles of at least two teeth during each said complete revolution of said workpiece.

3. The apparatus of claim 1 wherein said edges lie on a single surface of revolution.

4. The apparatus of claim 3 wherein said surface is planar.

5. The apparatus of claim 1 wherein said edges lie along straight lines intersecting the cutter axis.

6. The apparatus of claim 5 wherein said edges lie along the elements of a wide-angled cone.

7. The apparatus of claim 6 wherein said cone is concave, whereby said apparatus is adapted to provide crowned gear teeth.

8. The apparatus of claim 1 wherein each said edge has a path of movement in a plane perpendicular to the cutter axis.

9. The apparatus of claim 1 wherein said profiles are of involute form, said axes are perpendicular to each other, and said edges intersect a theoretical cutter pitch circle the radius of which equals the difference between the center distance spacing of said axes and the base circle radius of said gear; the circumferential spacing of adjacent said edges along said circles being equal to the product of the circular pitch of said gear at said base circle and the cotangent of the helix angle of said gear at said base circle.

10. The apparatus of claim 1 wherein said path is along a straight line parallel to the cutter axis.

11. The apparatus of claim 1 wherein said axes are perpendicular to each other.

12. The apparatus of claim 1 wherein said cutter comprises a tool-holding body mounted for rotation about the cutter axis and a plurality of tools removably mounted on said body, said tools providing said cutting edges, said cutting edges being spaced uniformly around the periphery of said body.

13. The apparatus of claim 1 further comprising a second cutter constructed and disposed in a manner analogous to the first said cutter for generating gear tooth profiles on the correspondingly opposite sides of said teeth from said profiles generated by said first cutter.

14. The apparatus of claim 1 having
  a main drive for imparting to said cutter and said workpiece said basic rates of movement about their respective axes, and
  a differential drive for adding to or subtracting from said basic rate of said cutter said differential rate, said main drive including a rotatably driven worm and a worm wheel meshing with said worm and being connected to said cutter to cause rotation thereof, said worm being mounted for movement along its axes, and said differential drive including a pivoted lever one arm of which is mounted for movement corresponding to said relative movement, another arm of which is mounted to drive said worm axially in said dependence on said relative movement, axial movement of said worm causing a differential rotation of said worm wheel and hence of said cutter.

15. The apparatus of claim 14 wherein the pivot axis of said lever is adjustable for control of the effective arm ratio of said lever.

16. The apparatus of claim 1 having
a main drive for imparting to said cutter and said workpiece said basic rates of movement about their respective axes,
a differential drive for adding to or subtracting from said basic rate of said cutter said differential rate, and
a second cutter constructed and disposed in a manner analogous to said first cutter for generating gear tooth profiles on the correspondingly opposite sides of said teeth from said profiles generated by the first said cutter, said differential drive including portions for adding said differential rate to said basic rate of one cutter and subtracting said differential rate from said basic rate of the other cutter.

17. The apparatus of claim 16 wherein said drive portions share opposite handed worms.

18. The apparatus of claim 13 further comprising an adjustable element for determining the phase angle between said cutters.

19. The apparatus of claim 1 further comprising an element effectively responsive to the instantaneously accumulated amount of said relative movement to vary automatically, between successive cuts tangent to the same desired profile, the dependency between said differential rate and said rate of relative movement.

20. The apparatus of claim 19 wherein said element is a cam.

21. The apparatus of claim 20 having
a main drive for imparting to said cutter and said workpiece said basic rates of movement about their respective axes, and
a differential drive for adding to or subtracting from said basic rate of said cutter said differential rate,
said main drive including a rotatably driven worm and a worm wheel meshing with said worm and being connected to said cutter to cause rotation thereof,
said worm being mounted for movement along its axis, and
said differential drive including a pivoted lever one arm of which is mounted for movement corresponding to said relative movement, another arm of which is mounted to drive said worm axially in said dependence on said relative movement, axial movement of said worm causing a differential rotation of said worm wheel and hence of said cutter,
said relative movement comprising movement of said support along said path,
said support being coupled to said one arm of said lever through a member operatively controlled by said cam to vary the position of said support relative to said one arm to produce the variation of said dependency, said cam being mounted for rotation corresponding to said movement of said support along said path.

22. The apparatus of claim 1 further comprising an element effectively responsive to the instantaneously accumulated amount of said relative movement to vary the rate thereof between successive cuts in the same toothspace.

23. The apparatus of claim 22 wherein said element is a cam.

24. The apparatus of claim 22 wherein said element is arranged to vary said rate to equalize the maximum thickness of successive chips of stock removed from said workpiece in the same toothspace.

25. The apparatus of claim 1 wherein
said support and said cutter are arranged for said relative movement in one direction along said path during a roughing cycle of operation, and in the opposite direction along said path during a finishing cycle of operation, and
said apparatus further comprises an element effectively responsive to the instantaneously accumulated amount of said relative movement during said roughing cycle to control the dependency between said differential rate and said rate of relative movement so that at least some cuts made during said roughing cycle are spaced from the desired profiles, cuts made during said finishing cycle being tangent to said desired profiles.

26. The apparatus of claim 25 further comprising a second cutter constructed and disposed in a manner analogous to the first said cutter for generating gear tooth profiles on the correspondingly opposite sides of said teeth from said profiles generated by said first cutter,
each said cutter having roughing edges facing generally away from said profiles generating cutting edges, respectively, for removing from said workpiece material adjacent the profile facing that one being generated and in the path of the other cutter,
said element being a control over the phase angle between said cutters and being so responsive to said amount of relative movement to cause said cuts during said roughing cycle to be sufficiently far from the desired profile so that all material in the path of said profile generating cutting edges of either cutter is removed by the roughing edges of the other cutter,
whereby said profile generating cutting edges remove stock only during said finishing cycle.

27. The apparatus of claim 26 wherein said profile generating cutting edges are sharper than said roughing edges.

28. The apparatus of claim 1 further comprising a control for adjusting the location of the cutter axis to determine the helix angle of said gear at its generating circle.

29. The apparatus of claim 1 wherein cuts are made respectively tangent to a desired profile of every tooth during each complete revolution of said workpiece.

30. The apparatus of claim 26 wherein said profile generating cutting edge lies at the intersection of said reference plane and said leading face.

31. The apparatus of claim 32 wherein said profiles are of involute form and said reference plane is at an angle to said axis equal to said helix angle taken at the base circle of said gear.

32. The apparatus of claim 1 wherein said cutter comprises a tool-holding body mounted for rotation about the cutter axis and a plurality of tools removably mounted on said body, each said tool comprising
a leading face provided with clearance relief relative to a reference plane, and
a said profile generating cutting edge bordering said leading face, said clearance relief being adjacent said edge,
said reference plane being at an angle to said cutter axis dependent upon the helix angle of said gear taken at the generating circle of said gear.